(12) United States Patent
Bae et al.

(10) Patent No.: US 12,301,360 B2
(45) Date of Patent: May 13, 2025

(54) HARQ-CAPABLE COMMUNICATION DEVICE AND METHOD THEREOF

(71) Applicant: SAMSUNG ELECTRONICS CO., LTD., Suwon-si (KR)

(72) Inventors: Jimin Bae, Hwaseong-si (KR); Eunhye Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 252 days.

(21) Appl. No.: 17/660,256

(22) Filed: Apr. 22, 2022

(65) Prior Publication Data

US 2022/0345250 A1    Oct. 27, 2022

(30) Foreign Application Priority Data

Apr. 23, 2021  (KR) .......................... 10-2021-0053164
Jun. 16, 2021  (KR) .......................... 10-2021-0078290

(51) Int. Cl.
*H04L 1/1812* (2023.01)
*H04L 1/08* (2006.01)
(Continued)

(52) U.S. Cl.
CPC .............. *H04L 1/1812* (2013.01); *H04L 1/08* (2013.01); *H04L 1/1642* (2013.01);
(Continued)

(58) Field of Classification Search
CPC ....... H04L 1/1812; H04L 1/08; H04L 1/1642; H04L 5/0053; H04L 27/2607;
(Continued)

(56) References Cited

U.S. PATENT DOCUMENTS 7,797,604 B2    9/2010   Lee et al.
10,841,949 B2   11/2020  Liu et al.
(Continued)

FOREIGN PATENT DOCUMENTS

JP      2019115082 A  *  7/2019  ............. H04B 7/024
KR   10-2020-0116024      10/2020
(Continued)

OTHER PUBLICATIONS

Huawei, et al., "Remaining details of sidelink physical layer structure", 3GPP Draft; R1-2000181, 3rd Generation Partnership Project (3GPP), Mobile Competence Centre; 650, Route Des Lucioles; F-06921 Sophia-Antipolis Cedex; France, vol. RAN Wg1, No. Feb. 24, 2020-Mar. 6, 2020, Feb. 15, 2020.
(Continued)

*Primary Examiner* — Rownak Islam
(74) *Attorney, Agent, or Firm* — MORGAN, LEWIS & BOCKIUS LLP

(57) ABSTRACT

An operating method of a receiving device may include receiving data from a target transmitting device of at least one transmitting device via a sidelink channel, determining whether to request transmission of replacement data for the data from the target transmitting device according to a performance result of a hybrid automatic repeat request (HARQ) process on the data, and when transmission of the replacement data is requested, transmitting to the target transmitting device a replacement data request signal distinct from an acknowledge (ACK) signal and a negative-ACK (NACK) signal.

20 Claims, 14 Drawing Sheets

(51) Int. Cl.
*H04L 1/1607* (2023.01)
*H04L 5/00* (2006.01)
*H04L 27/26* (2006.01)
*H04W 72/02* (2009.01)
*H04W 92/18* (2009.01)

(52) U.S. Cl.
CPC ........ *H04L 5/0053* (2013.01); *H04L 27/2607* (2013.01); *H04W 72/02* (2013.01); *H04W 92/18* (2013.01)

(58) Field of Classification Search
CPC ... H04L 1/1819; H04L 1/1835; H04L 1/1864; H04L 1/1816; H04W 72/02; H04W 92/18
USPC .......................................................... 370/335
See application file for complete search history.

(56) References Cited

U.S. PATENT DOCUMENTS

| | | | |
|---|---|---|---|
| 10,873,838 B2 | 12/2020 | Hwang et al. | |
| 10,893,509 B2 | 1/2021 | Mallik et al. | |
| 10,985,879 B2 | 4/2021 | Wu et al. | |
| 11,374,695 B2* | 6/2022 | Matsumura | H04J 13/22 |
| 2010/0088570 A1* | 4/2010 | Choi | H04L 1/1874 |
| | | | 714/751 |
| 2019/0356422 A1 | 11/2019 | Shimomura | |
| 2020/0304969 A1 | 9/2020 | Basu et al. | |
| 2020/0344006 A1 | 10/2020 | Shellhammer et al. | |
| 2020/0403737 A1 | 12/2020 | Yeo et al. | |
| 2021/0028891 A1 | 1/2021 | Zhou et al. | |
| 2021/0037576 A1 | 2/2021 | Shao et al. | |
| 2021/0050953 A1 | 2/2021 | Park | |
| 2021/0211243 A1* | 7/2021 | Wang | H04L 1/1896 |
| 2021/0328727 A1* | 10/2021 | Ryu | H04L 1/1819 |
| 2021/0385023 A1* | 12/2021 | Wang | H04W 72/20 |
| 2022/0361049 A1* | 11/2022 | Zhang | H04L 1/1851 |
| 2023/0188270 A1* | 6/2023 | Ouyang | H04L 1/18 |
| | | | 370/328 |
| 2023/0371073 A1* | 11/2023 | Liu | H04W 74/0816 |

FOREIGN PATENT DOCUMENTS

| | | |
|---|---|---|
| KR | 10-2020-0126939 | 11/2020 |
| KR | 10-2020-0127123 | 11/2020 |
| KR | 10-2020-0127827 | 11/2020 |
| KR | 10-2020-0127861 | 11/2020 |
| KR | 10-2020-0143271 | 12/2020 |
| KR | 10-2020-0144055 | 12/2020 |
| KR | 10-2020-0145212 | 12/2020 |
| WO | 2021063405 | 4/2021 |

OTHER PUBLICATIONS

Samsung, "Considerations on Sidelink HARQ Procedure", 3GPP Draft; R1-1902278, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 15, 2019.
Extended European Search Report dated Sep. 8, 2022 in related European Patent Application No. 22168092.9 (13 pages).
Castaneda Garcia, et al., "A Tutorial on 5G NR V2X Communications", IEEE Communications Surveys & Tutorials journal, Citation information: DOI 10.1109/COMST.2021.3057017, 56 pages.
3GPP TS 38.211 version 16.4.0 Release 16; Physical channels and modulation (137 pages).
3GPP TS 38.213 version 16.4.0 Release 16; Physical layer procedure for control; 185 pages.
3GPP TS 38.321 version 16.3.0 Release 16; Medium Access Control (MAC) protocol specification (158 pages).
3GPP TS 38.331 version 16.3.1 Release 16; Radio Resource Control (RRC); Protocol specification, 916 pages.

* cited by examiner

| #CSV | SHIFT VALUE 1 | | | | | |
|---|---|---|---|---|---|---|
| | CS IDX 1 | CS IDX 2 | CS IDX 3 | CS IDX 4 | CS IDX 5 | CS IDX 6 |
| 1 | 0 | – | – | – | – | – |
| 2 | 0 | 3 | – | – | – | – |
| 3 | 0 | 2 | 4 | – | – | – |
| 6 | 0 | 1 | 2 | 3 | 4 | 5 |

FIG. 8

| #CSV | Shift Value 2 | | |
|---|---|---|---|
| | NACK | IACK | ACK |
| 1 | 0 | a1 | 6 |
| 2 | | a2 | |
| 3 | | a3 | |
| 6 | | – | |

FIG. 10

| FEEDBACK TYPE | NACK | IACK | ACK |
|---|---|---|---|
| SHIFT VALUE 2 | 0 | 6 | - |

FIG. 11

| #CSV | Shift Value 1 | | | | | |
|---|---|---|---|---|---|---|
| | CS IDX 1 | CS IDX 2 | CS IDX 3 | CS IDX 4 | CS IDX 5 | CS IDX 6 |
| 1 | 0 | - | - | - | - | - |
| 2 | 0 | 3 | - | - | - | - |
| 3 | 0 | 2 | 3 | - | - | - |
| 4 | 0 | 1 | 2 | 3 | - | - |

FIG. 12

| FEEDBACK TYPE | NACK | IACK | ACK |
|---|---|---|---|
| SHIFT VALUE 2 | 0 | 4 | 8 |

HARQ-CAPABLE COMMUNICATION DEVICE AND METHOD THEREOF

CROSS-REFERENCE TO RELATED APPLICATIONS

This application is based on and claims priority under 35 U.S.C. § 119 to Korean Patent Application Nos 10-2021-0053164, filed on Apr. 23, 2021 and 10-2021-0078290, filed on Jun. 16, 2021 in the Korean Intellectual Property Office, the disclosures of which are incorporated by reference herein in their entireties.

TECHNICAL FIELD

This disclosure relates generally to a communication device, and more particularly, to a hybrid automatic repeat request (HARQ) capable communication device.

DISCUSSION OF THE RELATED ART

A wireless communication terminal may perform a forward error correction (FEC) process or an automatic repeat request (ARQ) process for securing the reliability of communication by using error detection or error compensation. When the wireless communication terminal operates based on an FEC process, an error in data transmitted from a transmitting device to a receiving device may be self-corrected at the receiving device by using an error correction code, without the need for the transmitting device to retransmit the data.

On the other hand, in an ARQ process, such an error may be corrected by means of the transmitting device retransmitting the data in response to a request by the receiving device. After each set of data transmissions, the receiving device sends a feedback signal in the form of an Acknowledgement (ACK) signal when the data is successfully decoded, or a negative-ACK (NACK) when the data is not successfully decoded. The retransmission is made in response to the NACK signal.

Hybrid ARQ (HARQ) is a transmission method that combines an ARQ process with an error correction process. Several different types of HARQ methods have been proposed, where each involves the transmission of ACK and NACK signals in appropriate circumstances. In some cases, a time delay problem of an upper layer is addressed by adding channel coding (e.g., FEC coding) for utilizing an error packet to an existing ARQ. HARQ is used in various mobile communication standards such as high speed packet access (HSPA) and long term evolution (LTE).

SUMMARY

Embodiments of the inventive concept provide a method of transmitting, by a receiving device to a transmitting device, a feedback signal requesting transmission of "replacement data" with respect to data received by a receiving device from the transmitting device.

According to an aspect of the inventive concept, there is provided an operating method of a receiving device, the operating method including: receiving data from a transmitting device via a sidelink channel; determining whether to request transmission of replacement data for the received data from the target transmitting device according to a performance result of a hybrid automatic repeat and request (HARQ) process on the data; and when transmission of the replacement data is requested, transmitting to the target transmitting device a replacement data request signal distinct from an acknowledge (ACK) signal and a negative-ACK (NACK) signal.

According to another aspect of the inventive concept, there is provided an operating method of a transmitting device, the operating method including: transmitting data to a receiving device via a sidelink channel; receiving, as a feedback signal from the receiving device, any one of an ACK signal, a NACK signal, and a replacement data request signal distinct from the ACK signal and the NACK signal according to a performance result of a HARQ process; determining a type of the feedback signal; and transmitting a replacement data to the receiving device in response to a case where the type of the feedback signal is that of the replacement data request signal.

According to another aspect of the inventive concept, there is provided a receiving device including: a HARQ buffer storing a performance result of an HARQ process on data received from a target transmitting device via a sidelink channel; an HARQ processor determining whether to request transmission of replacement data for data from the target transmitting device according to the performance result of the HARQ process on the received data, the HARQ processor, when the transmission of the replacement data is requested, determining a feedback signal to be transmitted to the target transmitting device as a replacement data request signal distinct from an ACK signal and a NACK signal; and a radio frequency integrated circuit (RFIC) transmitting the determined replacement data request signal to the target transmitting device.

According to another aspect of the inventive concept, there is provided a transmitting device including: an RFIC transmitting data to a receiving device via a sidelink channel, and receiving as a feedback signal any one of an ACK signal, a NACK signal, and a replacement data request signal distinct from the ACK signal and the NACK signal according to a performance result of a HARQ process from the receiving device; a buffer temporarily storing the feedback signal; and an HARQ processor determining a type of the feedback signal and generating replacement data to be transmitted to the receiving device in response to a case where the type of the feedback signal is a replacement data request signal.

In another aspect of the inventive concept, an operating method of a transmitting device includes transmitting first data to a receiving device, where the first data represents original data; receiving, as a feedback signal from the receiving device, an ACK signal, a NACK signal, or a replacement data request signal distinct from the ACK signal and the NACK signal, according to a performance result of a HARQ process with respect to the first data at the receiving device. If the NACK signal is received, second data is transmitted to the receiving device, where the second data represents at least a portion of the original data coded at a first coding rate. If the replacement data request signal is received, replacement data is transmitted to the receiving device, where the replacement data represents at least a portion of the original data coded at a second coding rate lower than the first coding rate.

The second coding rate produces the replacement data with a higher percentage of original data represented therein as compared to the second data. The likelihood of successful decoding of the replacement data may be higher than that for the second data, resulting in less re-transmissions.

BRIEF DESCRIPTION OF THE DRAWINGS

Embodiments of the inventive concept will be more clearly understood from the following detailed description taken in conjunction with the accompanying drawings in which:

FIG. 8 is a table of a second shift value corresponding to the example embodiments of FIGS. 6A through 7B;

FIG. 10 is a table of a second shift value corresponding to the example embodiments of FIGS. 9A and 9B;

FIG. 11 is a table of a first shift value according to another example embodiment;

FIG. 12 is a table of a second shift value according to another example embodiment;

DETAILED DESCRIPTION OF EMBODIMENTS

Hereinafter, embodiments of the inventive concept will be described in detail with reference to the accompanying drawings.

In the following description, a first device that transmits data may be referred to as a transmitting device, and a second device that receives the transmitted data may be a receiving device that performs a HARQ process with respect to the data. The receiving device may transmit a feedback signal, which provides a performance result of the HARQ process, to the transmitting device as feedback.

In the following description, data transmitted by the transmitting device in a HARQ process may represent "original data", which may also be referred to as "systematic data" or "user data". In a given data transmission that represents original data, the transmitted data, which may be referred to herein as "first data", contains a number of bits exceeding the number of bits of the original data, since the first data is typically prepared with padding bits for both error correction (e.g., FEC padding bits) and error detection (e.g., with CRC padding bits).

Briefly, in embodiments of the inventive concept to be described in detail hereafter, when a decoding process at the receiving device fails and a NACK feedback message indicating such failure is transmitted by the receiving device back to the transmitting device, the transmitting device may perform a retransmission of data by transmitting "second data" representing at least a portion of the original data that was represented by the first data. On the other hand, when the decoding process fails and the receiving device transmits a "replacement data request signal", which indicates that the decoding process failed for a particular reason (e.g., HARQ buffer saturation), the transmitting device may perform a retransmission of "replacement data" that differs from the second data but also represents at least a portion of the original data. The second data may have been coded at a first coding rate and the replacement data may have been coded at a second coding rate lower than the first coding rate. In other words, the second coding rate produces the replacement data with a higher percentage of original data represented therein as compared to the second data. As a result, the likelihood of successful decoding of the replacement data may be higher than that for the second data, resulting in less re-transmissions in the HARQ process.

Figure 1:
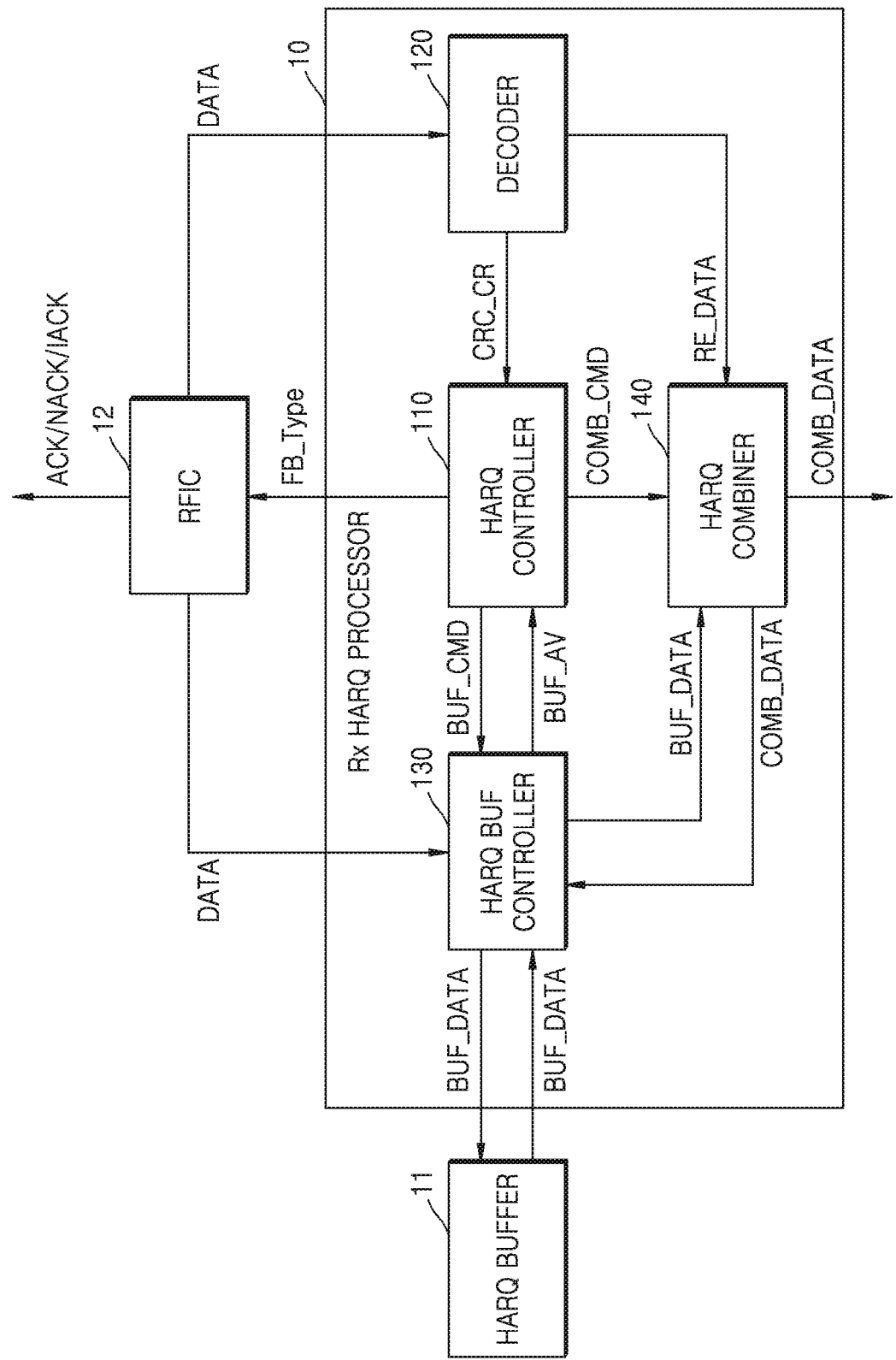
FIG. 1 is a schematic block diagram of a configuration of a receiving device of the inventive concept.

FIG. 1 is a schematic block diagram of a configuration of a receiving device according to an embodiment of the inventive concept. Embodiments will be described hereafter in the context of a sidelink communication, but aspects of the inventive concept may be applicable to other communication environments in other embodiments.

In a communication environment in which the transmitting device and the receiving device communicate data (i.e., transmit and/or receive data) via a sidelink, the transmitting device may transmit a physical sidelink shared channel (PSSCH) including PSSCH data to the receiving device, and the receiving device may transmit, to the transmitting device, a physical sidelink feedback channel (PSFCH) including feedback signals in response to the PSSCH. According to an embodiment, the feedback signal may include an acknowledge (ACK) signal, a negative-ACK (NACK) signal, and a replacement data request signal. Hereinafter, the replacement data request signal may be also referred to as an initial-ACK (LACK) signal.

The receiving device may receive data from a plurality of transmitting devices via the PSSCH and the PSFCH, unlike a physical downlink shared channel (PDSCH), and each transmitting device may transmit data to the receiving device by mapping any one of a plurality of HARQ identifications (ID) to the data to be transmitted. In this case, the number of HARQ processes that the receiving device having received data is capable of performing, and a capacity of a buffer temporarily storing the data may be limited.

Referring to FIG. 1, the receiving device receiving data may include a reception HARQ processor 10, an HARQ buffer 11, and a radio frequency integrated circuit (RFIC) 12. The reception HARQ processor 10 may include an HARQ controller 110, a decoder 120, an HARQ buffer controller 130, and an HARQ combiner 140. Various components of the reception HARQ processor 10 illustrated in FIG. 1 may be implemented in hardware, or software, which is performed by a central processing unit (CPU) in the reception HARQ processor 10. Alternatively, various components of the reception HARQ processor 10 may be also implemented as a combination of hardware and software. In FIG. 1, it is illustrated that various pieces of information are transmitted between components in the reception HARQ processor 10, but at least a portion of the various pieces of information may be generated during a software execution process of the CPU, and be also provided to each component.

The HARQ controller 110 may control the overall operation of components equipped in the reception HARQ processor 10. The HARQ controller 110 may control an operation of storing received data DATA in the HARQ buffer 11, or loading buffer data BUF_DATA from the HARQ buffer 11. According to an example embodiment, the HARQ controller 110 may receive a cyclical redundancy check (CRC) check result CRC_CR from the decoder 120, and based on the received CRC check result CRC_CR, may control a storing operation of HARQ data. As an example, when the HARQ controller 110 determines that data received as the CRC check result CRC_CR has an error, the HARQ controller 110 may instruct the HARQ buffer controller 130 to store the received data as buffer data BUF_DATA by transmitting a buffer command BUF_CMD thereto.

The decoder 120 may decode data DATA received via the RFIC 12 of the receiving device, and may provide the decoded result as the CRC check result CRC_CR to the HARQ controller 110. When the HARQ controller 110 receives the CRC check result CRC_CR of successful decoding, the HARQ controller 110 may control the RFIC 12 to transmit the ACK signal to a transmitting device, by determining a type of the feedback signal FB_Type as the ACK signal.

According to an embodiment, when the HARQ controller 110 receives the CRC check result CRC_CR of failed decoding, the HARQ controller 110 may control the RFIC 12 to transmit any one of the NACK signal and the replacement data request signal to the transmitting device by determining the type of the feedback signal FB_Type as the NACK signal and the replacement data request signal. The replacement data request signal may be a signal requesting again data that has been initially transmitted to the transmitting device in a state in which the HARQ buffer 11 is not capable of storing the buffer data BUF_DATA. The initially transmitted data may include an initially transmitted transmission block corresponding to each of the plurality of HARQ processes, which are performed in parallel in the receiving device, and as an example, may include the transmission block corresponding to redundancy version (RV) 0.

When it is determined that, as the CRC check result CRC_CR, decoding has failed, or data may not be stored in the HARQ buffer 11, or the initially transmitted data is required, the HARQ controller 110 may control the RFIC 12 to transmit the replacement data request signal to the transmitting device. When it is determined that the initially transmitted data is required, as an example, power of a signal received by the RFIC 12 may be instantly increased, and the case of failed de-mapping may be included.

The HARQ buffer controller 130 may control transmission of data between the HARQ buffer 11 and the reception HARQ processor 10. The HARQ buffer 11 may be used to temporarily store the received data until an HARQ combination is completed. In addition, in relation with combined data COMB_DATA, the combined data COMB_DATA may be directly provided to an external memory of the reception HARQ processor 10, or the combined data COMB_DATA may be temporarily stored in the HARQ buffer 11 and then moved to the external memory.

According to an embodiment, the HARQ buffer controller 130 may designate an address of the HARQ buffer 11 to store the buffer data BUF_DATA, and determine a degree of saturation of the HARQ buffer 11 based on the designated address. As an example, the HARQ buffer controller 130 may determine whether the address mapped to the buffer data BUF_DATA includes an end point address of a predefined address range of the HARQ buffer 11, and when the end point address is included, may determine that the HARQ buffer 11 is saturated.

According to an example embodiment, the HARQ buffer controller 130 may provide HARQ buffer availability information BUF_AV to the HARQ controller 110, and when the HARQ buffer 11 is determined to be saturated, may control the RFIC 12 to transmit the replacement data request signal to the transmitting device. In another scenario, when it is determined that decoding of data has failed but the HARQ buffer 11 is not saturated, the HARQ controller 110 may control the RFIC 12 to transmit the NACK signal to the transmitting device.

The HARQ combiner 140 may, in response to a combination instruction command COMB_CMD, combine retransmission data RE_DATA with the buffer data BUF_DATA stored in the HARQ buffer 11 and output the combined data COMB_DATA. The HARQ combiner 140 may receive the buffer data BUF_DATA via the HARQ buffer controller 130, and provide, to the HARQ buffer controller 130, the combined data COMB_DATA in which the retransmission data RE_DATA is combined with the buffer data BUF_DATA.

In the related art, the transmitting device, after having received only the ACK signal and the NACK signal as feedback signals with respect to the transmitted data, may be unable to determine whether data is stored in a HARQ buffer of the receiving device. Accordingly, the transmitting device may assume that the data has been stored in the receiving device, and transmit the retransmission data RE_DATA to the receiving device based on an efficient redundancy version index sequence. However, when the receiving device has not stored the data, and the retransmission data RE_DATA is in a high code rate status in which little systematic data is included therein, the receiving device may fail again in decoding regardless of a channel status, and additional retransmission may become necessary.

As an example, when the redundancy version index sequence used in the data transmission is a sequence of 0-2-3-1, RV0, which has highest self-decodability (that is, a highest decoding success probability before combining), may be used for the initial transmission, and the retransmission may be attempted in a sequence of RV2-RV3-RV1. When the coding rate equals or exceeds a threshold in a process of configuring data in the retransmission, because a systematic data message is not included in the retransmission data RE_DATA (or a smaller percentage of the systematic data message is represented by the total amount of retransmission data), a decoding success probability may be significantly reduced. (Here, a higher coding rate for a given data transmission means that to represent a certain number of original bits, i.e., systematic bits, a higher number of total bits are transmitted. In other words, a lower percentage of original bits is represented by the data transmission.) Accordingly, when the retransmission data RE_DATA has a high coding rate, the need for additional retransmission is more likely. An increase in the number of retransmissions may cause an increase in power consumption of the transmitting and receiving devices, an increase in latency, and a reduction in resource utilization.

However, in accordance with embodiments of the inventive concept, if the NACK signal is received, second data is transmitted to the receiving device, where the second data represents at least a portion of the original data coded at a first coding rate. If the replacement data request signal is received, replacement data is transmitted to the receiving device, which represents at least a portion of the original data coded at a second coding rate lower than the first coding rate. The second coding rate produces the replacement data with a higher percentage of original data represented therein as compared to the second data. Therefore, the likelihood of successful decoding of the replacement data may be higher than that for the second data, resulting in less re-transmissions in the HARQ process.

In a vehicle to everything (V2X) communication system, turnover of the HARQ process may be reduced due to the retransmission while an available HARQ process is lacking, which may cause a performance reduction in the entire network. For instance, in a communication environment configured with a plurality of transmitting devices, when data transmission of a high volume between devices with high reliability is required, a continuous transmission failure may affect the entire network of transmitting devices.

Embodiments of the inventive concept may address this issue by transmitting, from a receiving device under certain conditions, a replacement data request signal distinct from the ACK signal and the NACK signal to the transmitting device. Thereafter, by receiving replacement data of a low code rate, the receiving device may perform the HARQ process again in a more efficient manner.

Figure 2:
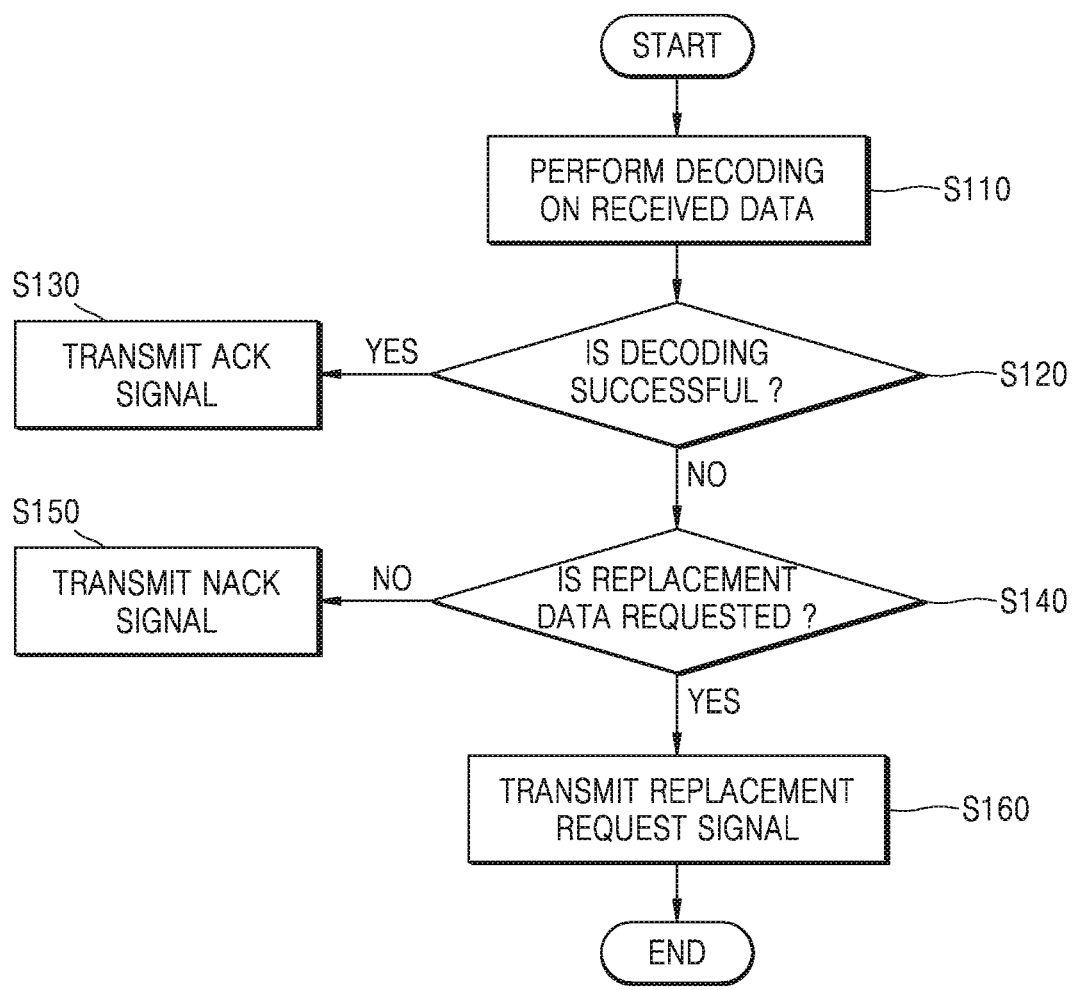
FIG. 2 is a flowchart of a method of transmitting any one of an acknowledge ACK signal, a negative-ACK (NACK) signal, and a replacement data request signal to a transmitting device as a feedback signal by a receiving device according to an example embodiment.

FIG. 2 is a flowchart of a method of transmitting an ACK signal, a NACK signal, or a replacement data request signal as a feedback signal by a receiving device to a transmitting device, according to an example embodiment. In the method, the receiving device may receive data from at least one transmitting device, and transmit the feedback signal to the transmitting device based on the decoding result for the received data. The receiving device may perform decoding on the received data (S110). Data received by the receiving device may include a CRC code, which is a transport block and an error detection block.

The receiving device may determine whether decoding has succeeded (S120). As an example, when the CRC code included in the data is identified as a certain value computed with respect to the remaining data in the data transmission, the receiving device may determine that decoding has succeeded. When it is determined that decoding has succeeded, the receiving device may transmit to the transmitting device the ACK signal as a signal representing successful decoding of data (S130).

When it is determined that decoding for the data has failed, the receiving device may determine whether replacement data for the receive data should be subsequently transmitted (S140). According to an example embodiment, when a replacement data request command is received from an upper layer of a physical layer (PHY) and a medium access control layer (MAC), which are performed by the HARQ process, it may be determined that the replacement data should be transmitted at each time of decoding failure. In addition, the receiving device may determine whether the replacement data should be transmitted based on an available storage space of the HARQ buffer 11. When it is determined that the replacement data is unnecessary, the receiving device may transmit the NACK signal to the transmitting device (S150).

Otherwise, when it is determined that the replacement data is desired, the receiving device may transmit the replacement data request signal to the transmitting device (S160). Accordingly, the receiving device may receive the replacement data from the transmitting device.

Figure 3:
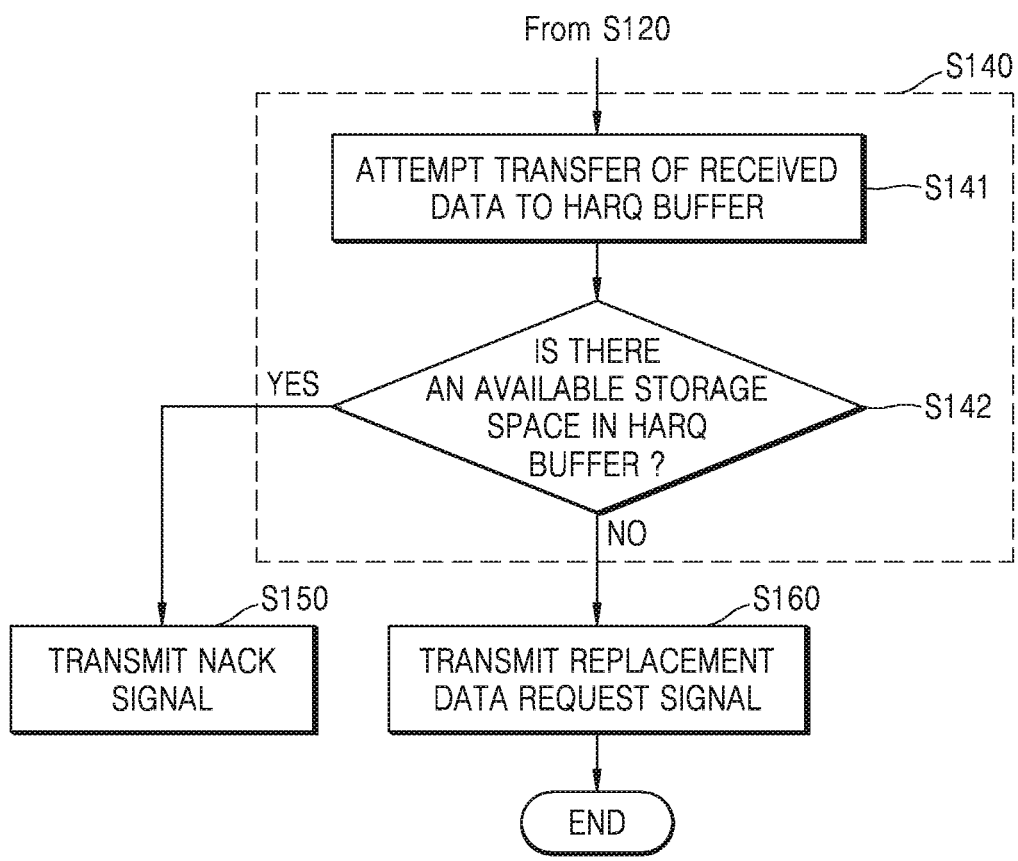
FIG. 3 is a flowchart of a method of transmitting a replacement data request signal to a transmitting device by a receiving device according to an example embodiment.

FIG. 3 is a flowchart of a method of transmitting a replacement data request signal to a transmitting device by a receiving device according to an example embodiment.

Referring to FIG. 3, the receiving device may determine transmitting of the replacement data request signal based on whether there is the available storage space in the HARQ buffer 11. When decoding on the received data fails, transmission of data to the HARQ buffer 11 may be attempted (S141). The HARQ buffer controller 130 may map an address corresponding to a storage space in the HARQ buffer 11 in an address sequence of the available storage region.

The receiving device may determine whether there is the available storage space in the HARQ buffer 11 (S142). The HARQ buffer controller 130 may determine whether an address mapped to data to be stored in the HARQ buffer 11 includes an end point address in an address range corresponding to a storage space.

When it is determined that an available storage space is in the HARQ buffer 11, the receiving device may store data, with an address mapped thereto, in the HARQ buffer 11, and transmit the NACK signal to the transmitting device (S150). When it is determined that the address mapped to the data does not include the end point address, the HARQ buffer controller 130 may transmit the NACK signal to the transmitting device.

Otherwise, when it is determined that the available storage space is not in the HARQ buffer 11, the receiving device may transmit the replacement data request signal to the transmitting device (S160). Otherwise, when it is determined that the address mapped to the data includes the end point address, the HARQ buffer controller 130 may transmit the replacement data request signal to the transmitting device.

Figures 4, 5:
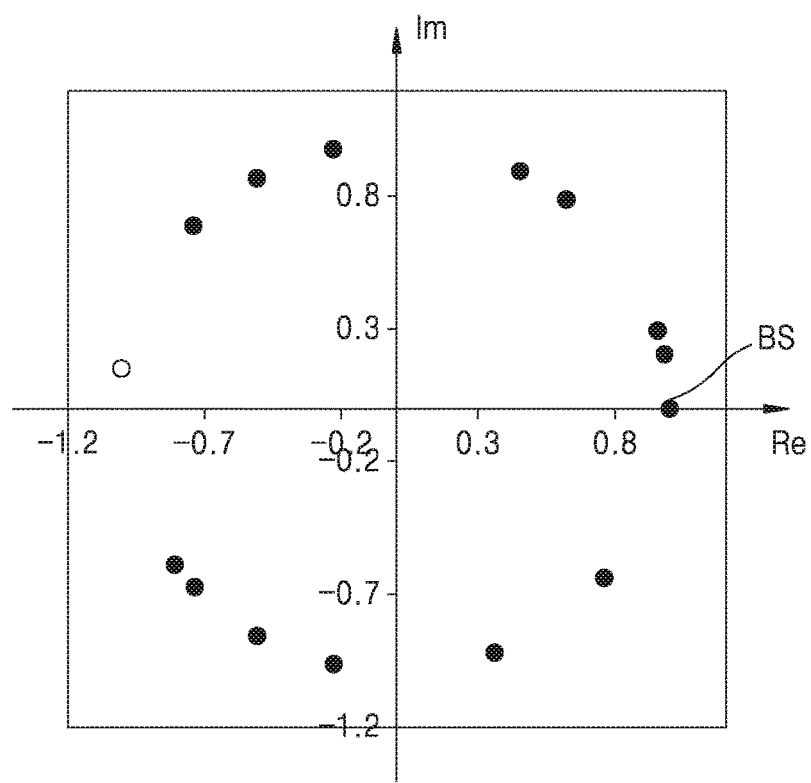
FIG. 4 is a complex plane graph illustrating phases of feedback signals cyclically shifted from a base sequence, according to an example embodiment.
FIG. 5 is a table of a first shift value according to an example embodiment.

FIG. 4 is a complex plane graph illustrating phases of feedback signals cyclically shifted from a base sequence BS, according to an example embodiment.

Referring to FIG. 4, the feedback signal may have a cyclically shifted phase from the base sequence BS. According to an example embodiment, the base sequence BS may be determined based on a resource pool allocated to the sidelink, and the resource pool may be a combination of frequency and time region resources that may be used in transceiving of a sidelink signal. In other words, because transceiving of a sidelink signal needs to be performed in a predetermined frequency-time resource, and the above resource may be defined as a resource pool.

The resource pool may be individually defined for transmission and reception, and may be used by being defined commonly for transmission and reception. In addition, the transmitting device and the receiving device may be allocated with one or a plurality of resource pools, and perform a transceiving operation of a sidelink signal. Setting information about the resource pool used for transceiving of a sidelink signal and other setting information about the sidelink may be pre-installed when devices are produced, configured by a current base station, pre-configured by another base station due to connection transfer from the current base station or by another network unit, or fixed, provisioned by a network, or self-constructed by a terminal.

To direct a frequency region resource of the resource pool, the receiving device and the transmitting device may direct an initial index and a length of physical resource blocks (PRB s) (for example, the number of PRB s) included in the resource pool, but are not limited thereto, and may configure one resource pool by directing the PRBs by using a bitmap.

To direct a time region resource of the resource pool, a base station may direct an orthogonal frequency-division multiplexing (OFDM) symbol or indices of a slot, which belongs to the resource pool, in bitmap units. Alternatively, according to another method, a system may be configured so that, by using a formula in a combination of particular slots, the slots satisfying a corresponding formula belong to a corresponding resource pool. In setting the time region resource, for example, the base station may notify devices/users which slots during a particular time period belong to a particular resource pool through use of the bitmap, and in this case, may direct according to the bitmap whether the slots correspond to the resource pool of time resource at each particular time period.

The receiving device of embodiments of the inventive concept may transmit the feedback signal to the transmitting device based on the PSFCH resource corresponding to the frequency region resource or the time region resource. In addition, even though the same frequency region resource and time region resource are used, the receiving device may perform code division multiplexing (CMD).

According to an example embodiment, the receiving device may generate a feedback signal having a cyclically shifted code from the base sequence BS based on the Zadoff-Chu sequence. Correlation between codes, which are generated based on the Zadoff-Chu sequence of different indices, may be low. Accordingly, even though the plurality of feedback signals are received from the same frequency region resource and time region resource, the transmitting device may easily differentiate the feedback signals, which are generated based on the Zadoff-Chu sequence of different indices.

According to FIG. 4, when the cyclic shift is performed from the base sequence BS in the Zadoff-Chu sequence of different indices, phases of respective cyclically shifted feedback signals may be different from each other. Hereinafter, a method of, by the receiving device, determining a first shift value according to a predefined cyclic shift index, determining the second shift value according to a HARQ process performance result, and determining an index of the Zadoff-Chu sequence based on the first shift value and the second shift value is described. FIG. 5 is a table of the first shift value according to an example embodiment.

Referring to FIG. 5, the receiving device may determine the number of cyclic shift indices by using an upper layer of the layers performing the HARQ process. The number of cyclic shift indices may be also pre-configured in a process of defining the resource pool between the transmitting device and the receiving device. In the table of FIG. 5, the number of cyclic shift indices may be determined to be one of 1, 2, 3, and 6, but the number/sequence may differ in other examples.

When the number of cyclic shift indices is determined to be 1, the receiving device may be in a status in which it has been determined not to perform the CDM, and in this case, the first shift value may be 0. When the number of cyclic shift indices is determined to be 2, the receiving device may determine the shift value 1 as any one of 0 and 3, and when the number of cyclic shift indices is determined to be 3, may determine the first shift value to be any one of 0, 2, and 4. Similarly, when the number of cyclic shift indices is determined to be 6, the receiving device may determine the first shift value as any one of 0 through 5. However, the first shift value determined by the receiving device of the inventive concept is not limited only to the embodiment of FIG. 5.

According to an example embodiment, the receiving device may determine any one of candidate cyclic shift indices as the cyclic shift index based on an ID of the receiving device and an ID of the transmitting device. The candidate cyclic shift index may be determined according to the number of cyclic shift indices, and when the number of cyclic shift index is one, the candidate cyclic shift index may be one. When the number of cyclic shift indices is two, the candidate cyclic shift index may be 1 and 2, when the number of cyclic shift indices is three, the candidate cyclic shift index may be 1 through 3, and when the number of cyclic shift indices is six, the candidate cyclic shift index may be 1 through 6. After the receiving device determines any one of the candidate cyclic shift indices to be the cyclic shift index based on the ID of the receiving device and the ID of the transmitting device, in sidelink communication in which any one of the receiving device and the transmitting device is different, the cyclic shift indices may be determined to be different from each other.

Figure 6A:
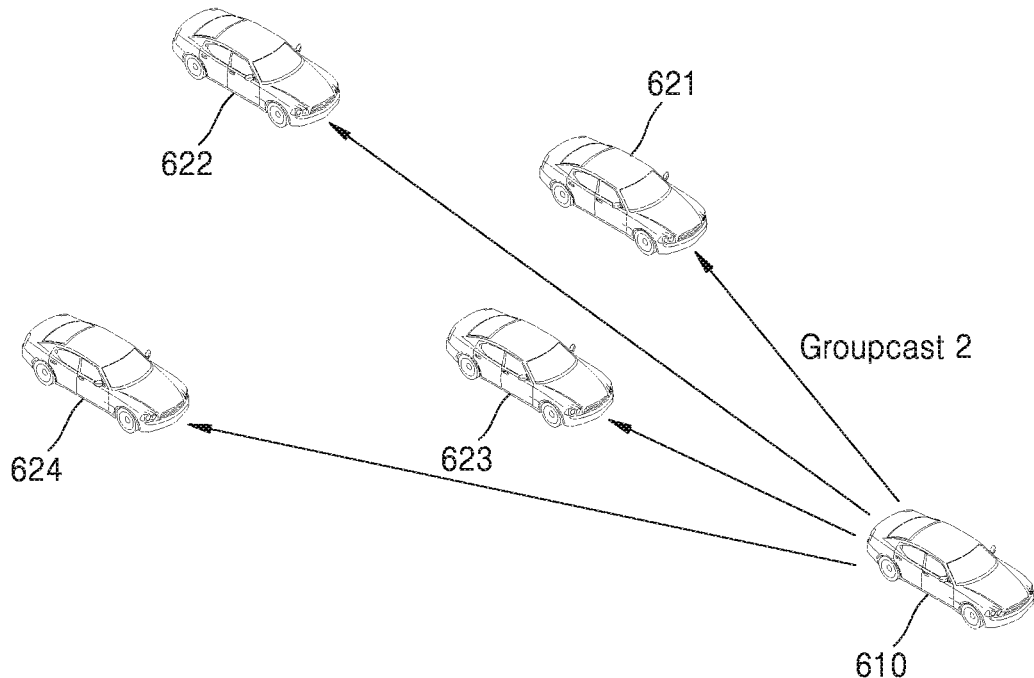
FIG. 6A is a diagram of an example in which a plurality of communication devices according to an example embodiment transmit data in a second groupcast method.
Figure 6B:
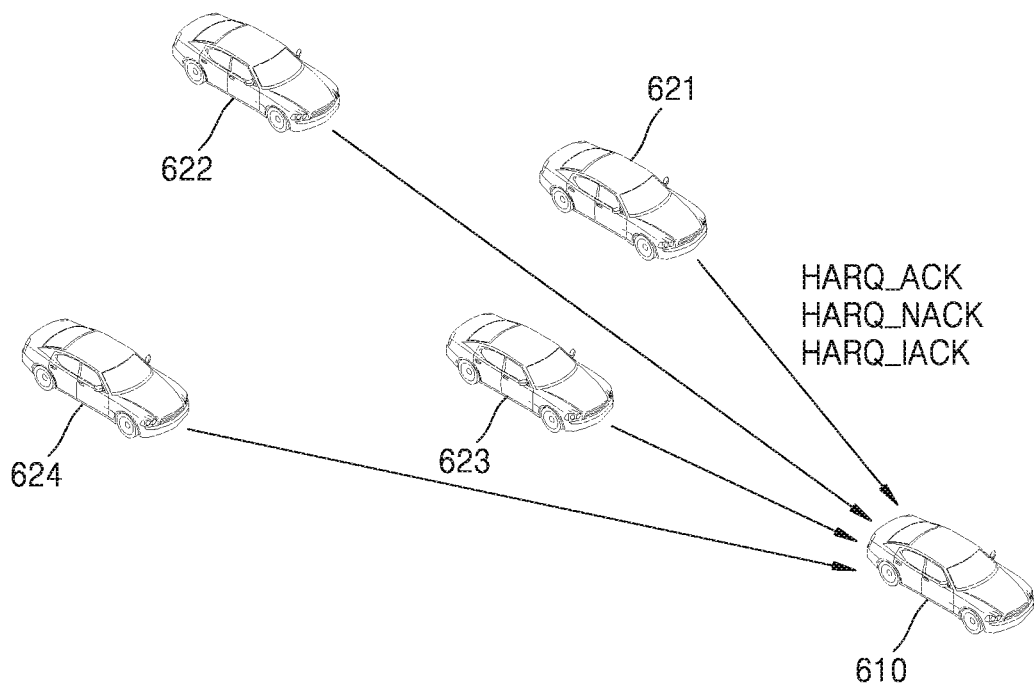
FIG. 6B is a diagram of an example in which receiving devices, which have received data according to an example embodiment of FIG. 6A, provide feedback signals to a transmitting device.

FIG. 6A is a diagram of an example in which a plurality of communication devices according to an example embodiment transmit data in a second groupcast method, and FIG. 6B is a diagram of an example in which receiving devices, which have received data according to an example embodiment of FIG. 6A, provide the feedback signals to a transmitting device.

The receiving device of the inventive concept may perform the sidelink communication in a first groupcast communication method, a second groupcast communication method, and the unicast communication method, and a determining method of the second shift value may vary according to each communication method. Descriptions are given for the second groupcast communication method with reference to FIGS. 6A and 6B, for the unicast communication method with reference to FIGS. 7A and 7B, and for the first groupcast communication method with reference to FIGS. 9A and 9B.

Referring to FIG. 6A, a transmitting device 610 may transmit common data to a plurality of receiving devices 621 through 624, that is, may transmit data in the groupcast method. The transmitting device 610 and the plurality of receiving devices 621 through 624 may be devices moving with vehicles. For the groupcast, at least one of separate control information (for example, sidelink control information (SCI)), a physical control channel (for example, a physical sidelink control channel (PSCCH)), and data may be further transmitted. In this case, the transmitting device 610 may transmit a message of performing of a second groupcast to the plurality of receiving devices 621 through 624 by using the SCI.

Referring to FIG. 6B, each of the plurality of receiving devices 621 through 624, which have received the common data by using the second groupcast, may transmit to the transmitting device 610 any one of the ACK signal, the NACK signal, and the replacement data request signal (or the IACK signal) as the feedback signal. When the sidelink communication is performed by using the second groupcast, the transmitting device 610 may differentiate a transmitting device 610, which has transmitted the feedback signal, via the PSCCH, and may determine a type of following data according to a type of the feedback signal.

Figure 7A:
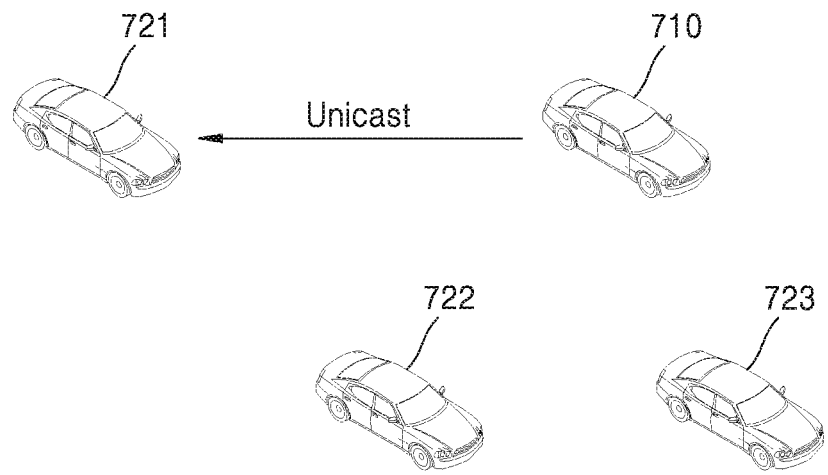
FIG. 7A is a diagram of an example in which a plurality of communication devices according to an example embodiment transmit data in a unicast method.
Figure 7B:
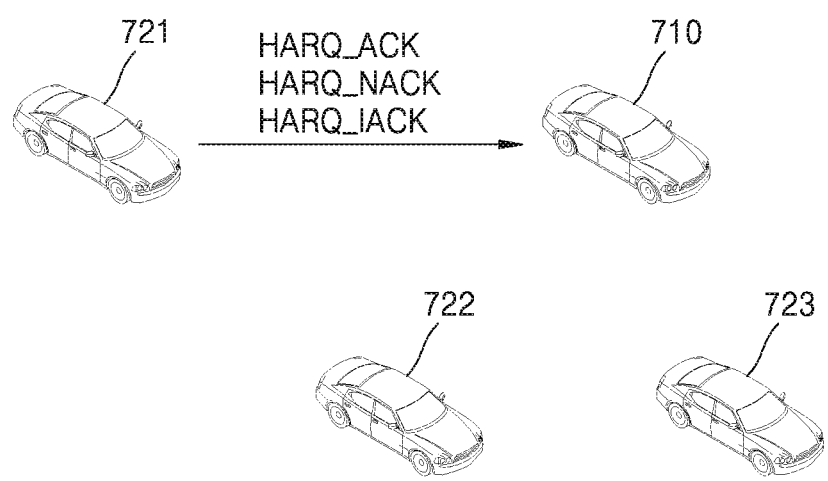
FIG. 7B is a diagram of an example in which the receiving device having received data according to an example embodiment of FIG. 7A provides feedback signals to a transmitting device.

FIG. 7A is a diagram of an example in which a plurality of communication devices according to an example embodiment transmit data in the unicast method, and FIG. 7B is a diagram of an example in which receiving devices, which have received data according to an example embodiment of FIG. 7A, provide the feedback signals to a transmitting device.

Referring to FIG. 7A, a transmitting device 710 may transmit data to a receiving device 721, which is any one of the plurality of receiving devices 721 through 723 except for the transmitting device 710. The other receiving devices 722 and 723 except for the transmitting device 710 and the receiving device 721 may not receive data transceived in the unicast method between the transmitting device 710 and the receiving device 721. The transceiving of data between the transmitting device 710 and the receiving device 721 in the unicast method may be performed by mapping in an agreed resource between the transmitting device 710 and the receiving device 721, or by scrambling by using a mutually agreed value, or by using a preset value in advance. Alternatively, the control information related with the data in the unicast method between the transmitting device 710 and the receiving device 721 may be mapped in a mutually agreed method. Alternatively, transceiving data between the transmitting device 710 and the receiving device 721 in the unicast method may include an operation of identifying unique IDs therebetween.

Referring to FIG. 7B, the receiving device 721 having received data in the unicast method may transmit to the transmitting device 710 any one of the ACK signal, the NACK signal, and the replacement data request signal (or the IACK signal) as the feedback signal. The transmitting device 710 may determine a type of the following data according to a type of the feedback signal.

FIG. 8 is a table of the second shift value corresponding to the example embodiments of FIGS. 6A through 7B.

Referring to FIG. 8, when a transmitting device and a receiving device communicate with each other in the second groupcast method and the unicast method, the receiving device may determine the shift value 2 according to a type of the feedback signal, which has been determined as a result of the HARQ process performance. As an example, when it is determined to transmit the NACK signal, the receiving device may determine the second shift value as 0, and when it is determined to transmit the ACK signal, the receiving device may set the second shift value as 6.

When it is determined to transmit the replacement data request signal, the receiving device may set the second shift value to a different value according to the number of cyclic shift indices. The second shift value may be set so that the cyclic shift value generated according to the second shift value corresponding to the redefined data request signal is set as at least one of remaining cyclic shift values except for a predefined cyclic shift value corresponding to the ACK signal and the NACK signal.

The receiving device may determine the first shift value and the second shift value, and may determine a sum of the first shift value and the second shift value as the cyclic shift value. According to an example embodiment, the determined cyclic shift value may correspond to the Zadoff-Chu sequence index.

As an example, referring to FIGS. 5 and 8, when the candidate cyclic shift indices are 0 through 11, and the number of cyclic shift indices is one, the cyclic shift values generated based on the NACK signal and the ACK signal may be any one of 0 and 6. Accordingly, a second shift value $a1$ for the case, where the number of cyclic shift indices is one, may be set as any one of 1 through 5, and 7 through 11, so that the cyclic shift value generated based on the redefined data request signal becomes any one of 1 through 5, and 7 through 11.

When the number of cyclic shift indices is two, the cyclic shift value generated based on the NACK signal and the ACK signal may be any one of 0, 3, 6, and 9. Accordingly, when the number of cyclic shift indices is two, a second shift value $a2$ may be set as any one of 1, 2, 4, 5, 7, 8, 10, and 11. In the same method, when the number of cyclic shift indices is three, the cyclic shift value generated based on the NACK signal and the ACK signal may be any one of 0, 2, 4, 6, 8, and 10, and when the number of cyclic shift indices is three, a second shift value $a3$ may be set as any one of odd numbers less than 11.

However, when the number of cyclic shift indices is six, because the cyclic shift value generated based on the NACK signal and the ACK signal is any one of 0 through 11, a candidate cyclic shift value corresponding to the replacement data request signal may not be allocated. Accordingly, when the number of cyclic shift indices is allocated as six, it may be understood that the receiving device is not to transmit the replacement data request signal.

Figure 9A:
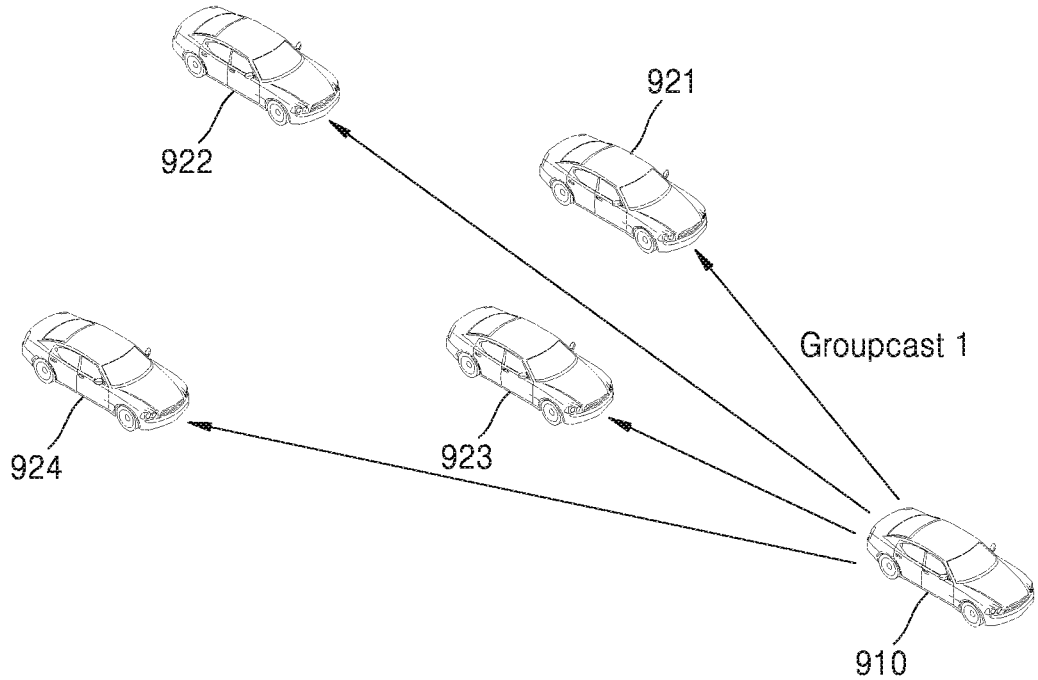
FIG. 9A is a diagram of an example in which a plurality of communication devices according to an example embodiment transmit data in a first groupcast method.
Figure 9B:
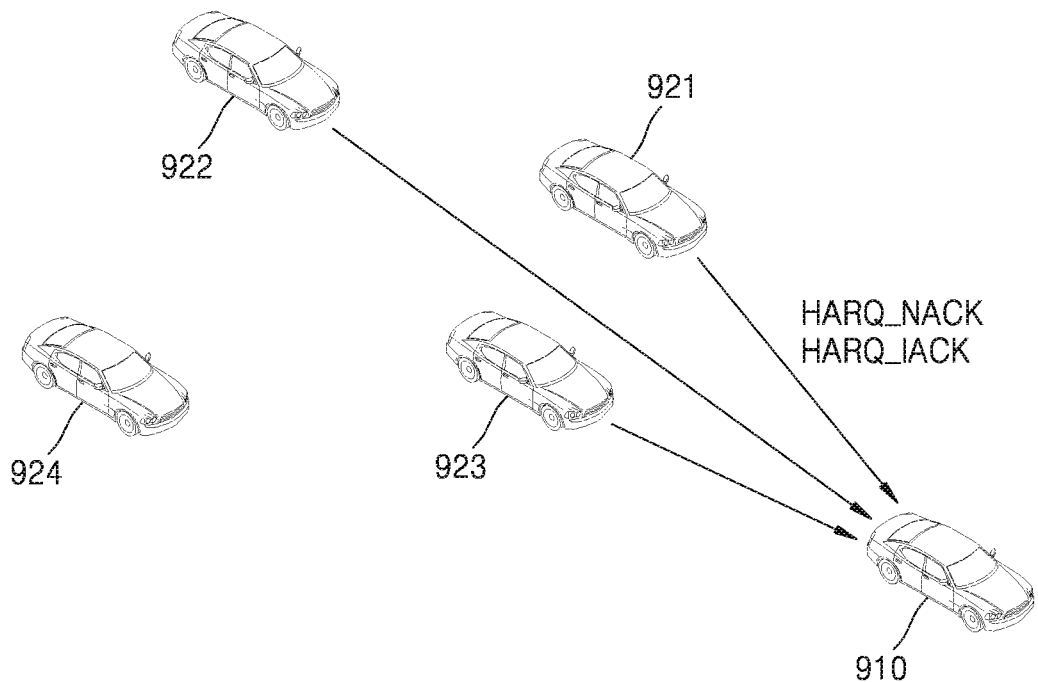
FIG. 9B is a diagram of an example in which the receiving devices having received data according to an example embodiment of FIG. 9A provide feedback signals to a transmitting device.

FIG. 9A is a diagram of an example in which a plurality of communication devices according to an example embodiment transmit data in the first groupcast method, and FIG. 9B is a diagram of an example in which receiving devices, which have received data according to an example embodiment of FIG. 9A, feedback the feedback signals to a transmitting device.

Referring to FIG. 9A, a transmitting device 910 may transmit common data to first through fourth receiving devices 921 through 924, that is, may transmit data in the groupcast method. In this case, the transmitting device 910 may be pre-configured to transmit data in the first groupcast method, and in this case, the transmitting device 910 may transmit a message of performing the first groupcast to the first through fourth receiving devices 921 through 924 via the SCI.

Referring to FIG. 9B, each of first through fourth receiving devices 921 through 924, which have received the common data by using the first groupcast, may transmit to the transmitting device 910 any one of the NACK signal and the replacement data request signal (or the "IACK signal") as the feedback signal. When data is received in the first groupcast method, the first through fourth receiving devices 921 through 924 may determine whether received data may be decoded, and unlike the case of the second groupcast of FIGS. 6A and 6B, the first groupcast may provide the feedback signal to the transmitting device 910 only when the data may not be decoded.

According to an example embodiment, the receiving device, which has succeeded in decoding of the received data, of the first through fourth receiving devices 921 through 924 may not provide any feedback signal to the transmitting device 910. Referring to FIG. 9B, the fourth receiving device 924 may not transmit the feedback signal to the transmitting device 910 by succeeding in data decoding.

When communication is performed in the first groupcast method, the transmitting device 910 may not determine whether the feedback signal has been transmitted by any receiving device, but may determine the following data to be transmitted to the first through fourth receiving devices 921 through 924 according to a ratio of the number of first through fourth receiving devices 921 through 924 having transmitted the feedback signal over the number of first through fourth receiving devices 921 through 924.

According to an embodiment, the transmitting device 910 may determine whether the replacement data needs to be provided to the first through fourth receiving devices 921 through 924 in the groupcast method based on a ratio of the number of receiving devices having transmitted the replacement data request signal over the number of first through fourth receiving devices 921 through 924. An embodiment, in which whether the replacement data is to be provided to the first through fourth receiving devices 921 through 924 based on the ratio of the receiving devices having transmitted the replacement data request signal is determined, is described in detail below with reference to FIG. 16.

FIG. 10 is a table of the second shift value corresponding to the example embodiments of FIGS. 9A and 9B.

Referring to FIG. 10, when the transmitting device and the receiving device communicate in the first groupcast method, the transmitting device and the receiving device may not generate the ACK signal as the feedback signal even when data decoding is successful, but may generate any one of the NACK signal and the replacement data request signal as the feedback signal only when the data decoding fails.

When decoding of data fails, the receiving device may determine whether to request the replacement data for data from the transmitting device, and when the replacement data is requested, the receiving device may set the second shift value as 6. Conversely, when the replacement data is not requested, the second shift value may be set as 0.

The receiving device may determine the cyclic shift value by summing the first shift value with the second shift value. Referring to FIGS. 5 and 10, when the number of cyclic shift indices is one, the receiving device may generate 0 or 6 as the cyclic shift value according to the type of feedback signal. When the number of cyclic shift indices is two, and the NACK signal is transmitted, the receiving device may generate 0 or 3 as the cyclic shift value according to the cyclic shift index, and when the replacement data request signal is transmitted, the receiving device may generate 6 or 9 as the cyclic shift value according to the cyclic shift index.

In the same manner, when the number of cyclic shift indices is three, any one of 0, 2, and 4 may be generated as the cyclic shift value corresponding to the NACK signal, and any one of 6, 8, and 10 may be generated as the cyclic shift value corresponding to the replacement data request signal. When the number of cyclic shift indices is six, any one of 0 through 5 may be generated as the cyclic shift value corresponding to the NACK signal, and any one of 6 through 11 may be generated as the cyclic shift value corresponding to the replacement data request signal.

FIG. 11 is a table of the first shift value according to another example embodiment.

According to an embodiment, when the receiving device is configured in advance so that the replacement data request signal is provided as the feedback signal to the transmitting device, the receiving device may adjust the number of cyclic shift indices. According to an example embodiment, the candidate cyclic shift index may be set so that a value obtained by dividing the number of candidate cyclic shift values by the number of types of feedback signals including the ACK signal, the NACK signal, and the replacement data request signal is equal to or less than the number of cyclic shift indices. The receiving device may determine the first shift value by selecting any one of the set candidate cyclic shift indices.

As an example, when the number of candidate cyclic shift values determining the Zadoff-Chu sequence is twelve, and types of the feedback signals are three, the receiving device may determine the maximum number of cyclic shift indices as four, and may set the candidate cyclic shift index corresponding to the number of cyclic shift indices.

Referring to FIG. 11, when the number of cyclic shift indices is one, the first shift value may be set as 0, when the number of cyclic shift indices is two, the first shift value may be set as any one of 0 and 3, when the number of cyclic shift indices is three, the first shift value may be set as any one of 0, 2, and 3, and when the number of cyclic shift indices is four, the first shift value may be set as any one of 0, 1, 2, and 3. However, the first shift values corresponding to the cyclic shift indices in FIG. 11 are not limited thereto.

FIG. 12 is a table of the second shift value according to another example embodiment.

Referring to FIG. 12, unlike the second shift value set in FIGS. 8 and 10, the second shift value corresponding to a type of the feedback signal may be set regardless of the number of cyclic shift indices. As an example, when it is determined to transmit the NACK signal, the receiving device may set 0 as the second shift value, when it is determined to transmit the replacement data request signal, the receiving device may set 4 as the second shift value, and when it is determined to transmit the ACK signal, the receiving device may set 8 as the second shift value.

Referring to FIGS. 11 and 12, the receiving device may generate the cyclic shift value by adding the first shift value set according to the embodiment of FIG. 11 and the second shift value set according to the embodiment of FIG. 12. When the number of cyclic shift indices is one, the cyclic shift value may be determined to be any one of 0, 4, and 8 according to a type of the feedback signal. When the number of cyclic shift indices is two, the cyclic shift value may be determined to be any one of 0, 4, and 8 corresponding to a first cyclic shift index, and to be any one of 3, 7, and 11 corresponding to a second cyclic shift index, according to the type of the feedback signal.

When the number of cyclic shift indices is three, the cyclic shift value may be determined to be any one of 0, 4, and 8 corresponding to the first cyclic shift index, to be any one of 2, 6, and 10 corresponding to the second cyclic shift index, and to be any one of 3, 7, and 11 corresponding to a third cyclic shift index, according to the type of the feedback signal. When the number of cyclic shift indices is four, the cyclic shift value may be determined to be any one of 0, 4, and 8 corresponding to the first cyclic shift index, to be any one of 1, 5, and 9 corresponding to the second cyclic shift index, to be any one of 2, 6, and 10 corresponding to the third cyclic shift index, and to be any one of 3, 7, and 11 corresponding to a fourth cyclic shift index, according to the type of the feedback signal.

In example embodiments of FIGS. 5 and 8, when the number of cyclic shift indices is six, the cyclic shift value corresponding to the replacement data request signal may not be defined, but the cyclic shift value set according to example embodiments of FIGS. 10 and 11 may be defined as a cyclic shift value corresponding to the replacement data request signal for the total number of cyclic shift indices.

According to an example embodiment, the receiving device and the transmitting device of the inventive concept may include devices capable of providing the replacement data request signal distinct from the ACK signal and the NACK signal, and may clash with a communication method of a device supporting only transmission of a general ACK signal and a NACK signal. Accordingly, the receiving device and the transmitting device of the inventive concept may also separate and use the PSFCH resource of a device supporting only the ACK signal and the NACK signal. As an example, the PSFCH resource allocated to the transmitting device and the receiving device of the inventive concept may be allocated after at least one of frequency and time region resource is differentiated from the PSFCH resource of a device supporting only the ACK signal and the NACK signal.

Figure 13:
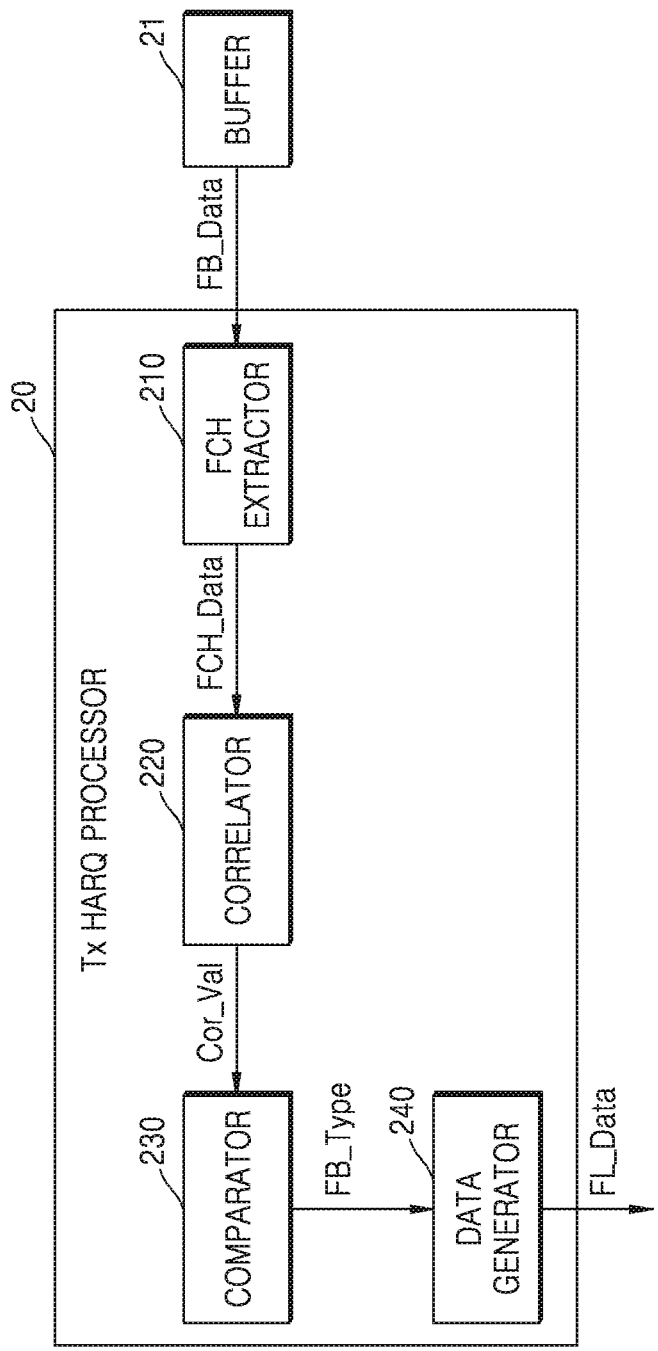
FIG. 13 is a block diagram of a schematic configuration of a transmitting device having received a feedback signal, according to an embodiment.

FIG. 13 is a block diagram of a schematic configuration of a transmitting device having received a feedback signal, according to an embodiment.

Referring to FIG. 13, the transmitting device of the inventive concept may receive the feedback signal from a receiving device, and may determine the type of feedback signal FB_Type by extracting the cyclic shift value corresponding to the feedback signal. The transmitting device may include a transmission HARQ processor 20 and a buffer 21. The buffer 21 may temporarily store the feedback signal after receiving the feedback signal via the RFIC of the transmitting device, and may transfer the feedback data FB_Data to the transmission HARQ processor 20 in response to a request of the transmission HARQ processor 20. The feedback data FB_Data may be a data packet in which the feedback signal received from a receiving device is generated as a series of codes, and may include PSSCH, PSCCH, and PSFCH, which are generated by the receiving device.

The transmission HARQ processor 20 may include a feedback channel (FCH) extractor 210, a correlator 220, a comparator 230, and a data generator 240. The FCH extractor 210 may extract the FCH data FCH_Data from the feedback data FB_Data received from the buffer 21. The FCH data FCH_Data may be data regarding the feedback channel of information included in the Feedback data FB_Data, and the FCH extractor 210 may extract information corresponding to a symbol of a predefined sequence of the Feedback data FB_Data configured with a plurality of symbols, as the FCH data FCH_Data.

The correlator 220 may extract a correlation value Cor_Val corresponding to any one of the cyclic shift values by performing a correlation computation. As an example, the correlator 220 may perform the correlation computation based on a correlation filter, and may output the cyclic shift value applied when the feedback signal has been generated, as the correlation value Cor_Val.

The comparator 230 may determine the received type of feedback signal FB_Type by comparing the correlation value Cor_Val output by the correlator 220 to a plurality of reference values. The cyclic shift value according to the number of cyclic shift indices may be pre-configured between the transmitting device and the receiving device for each type of feedback signal FB_Type. Accordingly, the comparator 230 may determine the cyclic shift value corresponding to the feedback signal based on the comparison of the correlation value Cor_Val to the reference values, and may determine the type of feedback signal FB_Type based on the cyclic shift value.

The data generator 240 may generate following data FL_Data according to the type of feedback signal FB_Type. When the feedback signal is the replacement data request signal, data initially transmitted to the receiving device may be provided. As an example, the transmitting device may retransmit the initially transmitted data to the receiving device by resetting a sequence of a redundancy version or setting as an initial transmission according to a protocol of a network. In other words, when the replacement data request signal is received, the replacement data may be transmitted by resetting the HARQ process. When the transmitting device receives the ACK signal, the HARQ process for new data may be performed, and when the NACK signal is received, the retransmission data may be transmitted to the receiving device by changing the redundancy version.

Figure 14:
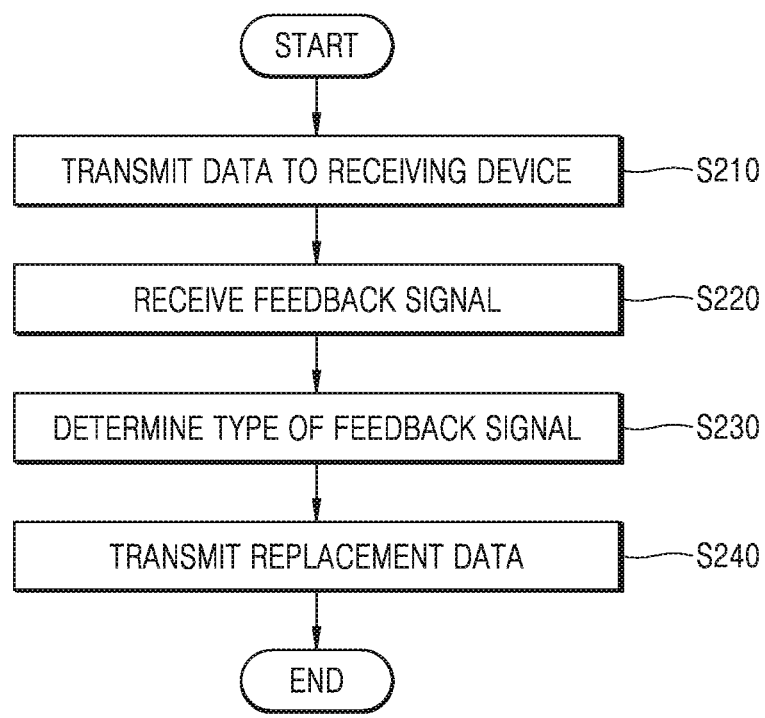
FIG. 14 is a flowchart of a method of transmitting replacement data by a transmitting device, according to an example embodiment.

FIG. 14 is a flowchart of a method of transmitting the replacement data by a transmitting device, according to an example embodiment.

Referring to FIG. 14, the transmitting device may transmit the transport block with the CRC code combined thereto, to at least one receiving device, and when the replacement data request signal is received as the feedback signal corresponding to data from the receiving device, may transmit the replacement data to the at least one receiving device.

The transmitting device may transmit to the receiving device data including the PSSCH and the PSCCH after mapping the data to the HARQ ID (S210).

The transmitting device may receive any one of the feedback signals from the receiving device (S220). As an example, the transmitting device may receive from the receiving device any one of the ACK signal, the NACK signal, and the replacement data request signal as the feedback signal. The ACK signal, the NACK signal, and the replacement data request signal may be signals which have been generated according to cyclically shifted codes from the base sequence to different cyclic shift values from each other.

The transmitting device may determine the type of the received feedback signal (S230). As described with reference to FIG. 13, the transmitting device may determine the type of the feedback signal based on a correlation value generated according to the correlation computation of the correlator 220.

The transmitting device may transmit the replacement data to the receiving device in response to the case in which the type of the feedback signal is the replacement data request signal (S240). As an example, when the receiving device having received data determines that a reset of the HARQ process is necessary, the receiving device may provide the replacement data request signal to the transmitting device.

The case, in which it is determined that the reset of the HARQ process is necessary, may include the case in which it is determined that soft combining by using the received data may be performed even though the receiving device has received data. As an example, the case, in which it is determined that the reset of the HARQ process is necessary, may include a status where the received data may not be stored in the HARQ buffer 11.

According to an example embodiment, the transmitting device may transmit the replacement data to the receiving device by setting as the initial transmission according to the protocol of a network, initializing a sequence of the redundancy version, or changing a combining method. The transmitting device may provide the replacement data to the receiving device by setting the redundancy version as 0, or defining the protocol so that a count is set to the initial transmission.

According to an example embodiment, when the combining method used for performing an existing HARQ process is an incremental redundancy (IR) combining method, the transmitter address having received the replacement data request signal may instruct the receiving device to perform the HARQ process in a chase combining method. Unlike the case in which the IR combining method is performed, when the chase combining method is performed, data configured with the same bit combination as the initially transmitted data may be provided to the receiving device.

Figure 15:
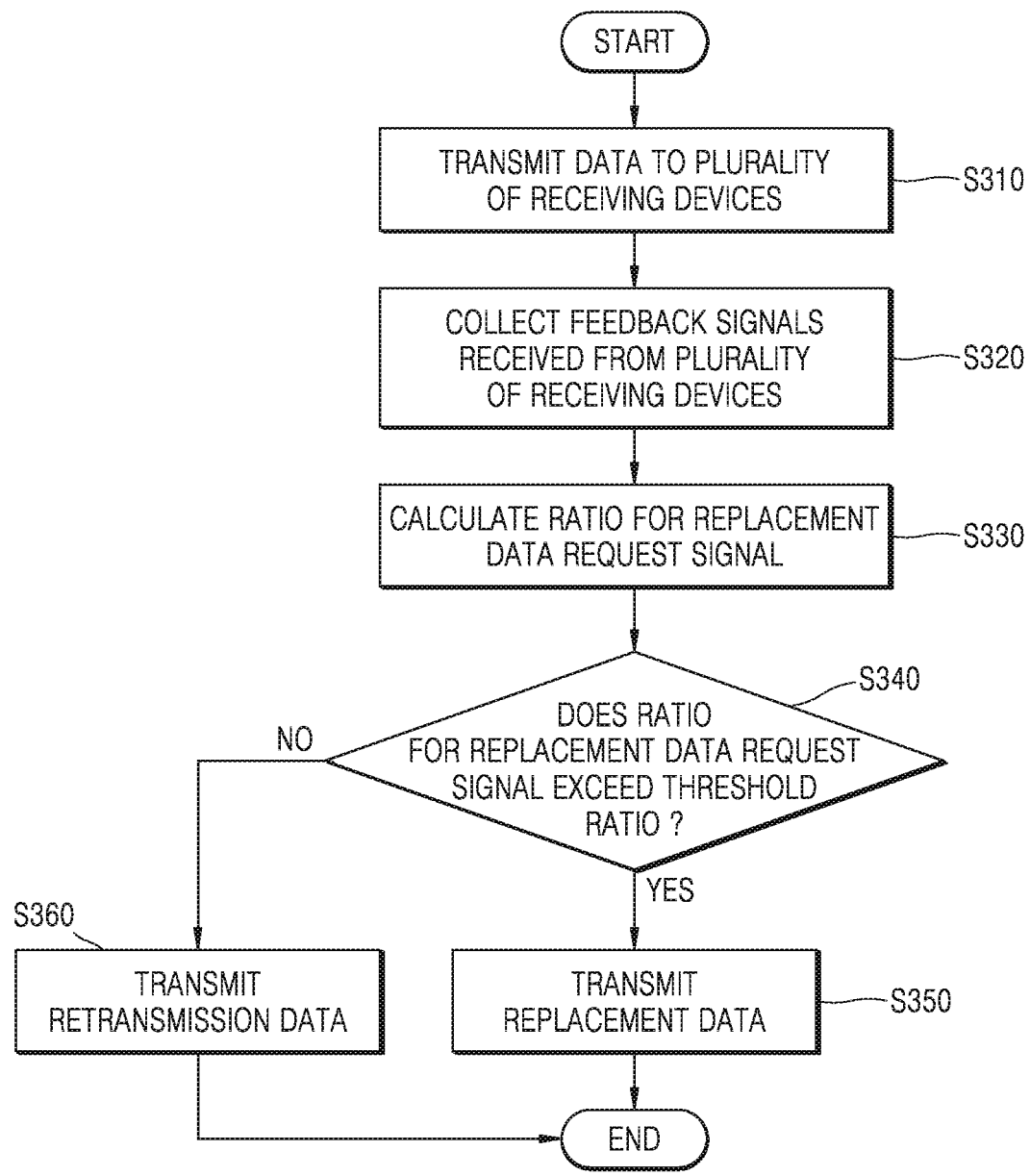
FIG. 15 is a flowchart of a method of transmitting retransmission data or replacement data when a transmitting device receives feedback signals from a plurality of receiving devices, according to an example embodiment.

FIG. 15 is a flowchart of a method of transmitting retransmission data or replacement data when a transmitting device receives feedback signals from a plurality of receiving devices, according to an example embodiment.

Referring to FIG. 15, when the transmitting device receives data from the plurality of receiving devices in the first groupcast method, the transmitting device may determine whether to transmit the replacement data based on the feedback signals received from the plurality of receiving devices.

The transmitting device may transmit data to the plurality of receiving devices in the first groupcast method (S310). Although the first groupcast method may not specify a receiving device having transmitted the feedback signal, the first groupcast method may be a groupcast method which determines following data according to the type and a ratio of the feedback signal received by the transmitting device.

The feedback signals received by the plurality of receiving devices may be collected (S320). When the transmitting device and the receiving device communicate in the first groupcast method and the receiving device succeeds in data decoding, because the feedback signal is not transmitted to the transmitting device, the transmitting device may receive the feedback signals only from the receiving devices which have failed in the data decoding.

The transmitting device may calculate a ratio for the replacement data request signal (S330). According to an example embodiment, the ratio for the replacement data request signal may be a ratio of the number of receiving devices having transmitted the replacement data request signals over the number of receiving devices having transmitted the feedback signals. In other words, the transmitting device may calculate a ratio of the number of receiving devices having transmitted the replacement data request signals over the number of receiving devices having transmitted the NACK signals.

The transmitting device may determine whether a ratio for the replacement data request signal exceeds a threshold ratio (S340). The threshold ratio may be a preset ratio when communication is performed in the first groupcast method, but may also be a ratio varying according to the situation.

When the ratio for the replacement data request signal exceeds the threshold ratio, the transmitting device may transmit the replacement data (S350), and when the ratio for the replacement data request signal is equal to or less than the threshold ratio, the transmitting device may transmit the retransmission data (S360). The retransmission data may, as an example, be data that is transmitted after the redundancy version is changed from previously transmitted data.

Figure 16:
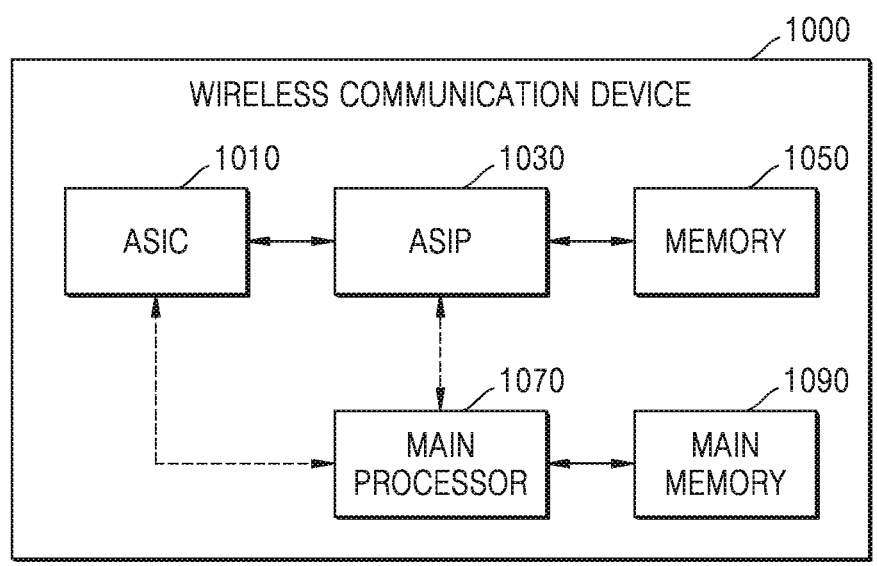
FIG. 16 is a block diagram of a configuration of a wireless communication device, according to an example embodiment.

FIG. 16 illustrates a wireless communication device 1000 according to an example embodiment.

Referring to FIG. 16, the wireless communication device 1000 may include an application specific integrated circuit (ASIC) 1010, an application specific instruction set processor (ASIP) 1030 connected to the ASIC 1010, a memory 1050 connected to the ASIP 1030, a main processor 1070 connected to the ASIC 1010 and the ASIP 1020, and a main memory 1090 connected to the main processor 1070. The ASIP 1030 and the main processor 1070 may communicate with each other. The ASIP 1030, the memory 1050, the main processor 1070, and the main memory 1090 may be embedded in one chip.

The ASIP 1030, which is an integrated circuit customized for a particular purpose, may support an exclusive instruction set for a particular application, and may execute instructions included in an instruction set. The memory 1050 may communicate with the ASIP 1030, and as a non-transitory storage device, may store a plurality of instructions which are executed by the ASIP 1030. For example, the memory 1050 may include any type of memory accessible by the ASIP 1030, such as random-access memory (RAM), read-only memory (ROM), tape, a magnetic disk, an optical disk, a volatile memory, a non-volatile memory, or a combination thereof, as non-limiting examples.

The main processor 1070 may control the wireless communication device 1000 by executing a plurality of instructions. For example, the main processor 1070 may control the ASIC 1010 and the ASIP 1030, and may process data received via a communication network or process a user input to the wireless communication device 1000. The main memory 1090 may communicate with the main processor 1070, and as a non-transitory storage device, may store a plurality of instructions which are executed by the main processor 1070. For example, the main memory 1090 may include any type of memory accessible by the main processor 1070, such as RAM, ROM, tape, a magnetic disk, an optical disk, volatile memory, non-volatile memory, or a combination thereof, as non-limiting examples.

Communication methods according to one or more of the above-described example embodiments may be performed by at least one of the components included in the wireless communication device 1000 of FIG. 16. In some embodiments, at least one operation of operations of a wireless communication method of each of the reception HARQ processor 10 in FIG. 1 and the transmission HARQ processor 20 in FIG. 13 may be implemented as a plurality of instructions stored in the memory 150. When the ASIP 1030 executes the plurality of instructions stored in the memory 150, at least a portion of an operation of each of the reception HARQ processor 10 in FIG. 1 and the transmission HARQ processor 20 in FIG. 13 may be performed. In some embodiments, at least one operation of operations of a wireless communication method of each of the reception HARQ processor 10 in FIG. 1 and the transmission HARQ processor 20 in FIG. 13 may be implemented as a hardware block designed by using a logic synthesis or the like and may also be included in the ASIC 1010. In some embodiments, at least one operation of operations of a wireless communication method of each of the reception HARQ processor 10 in FIG. 1 and the transmission HARQ processor 20 in FIG. 13 may be implemented as a plurality of instructions stored in the main memory 1090, and when the main processor 1070 executes the plurality of instructions stored in the main memory 1090, at least one operation of operations of a wireless communication method, that is, at least a portion of an operation of each of the reception HARQ processor 10 in FIG. 1 and the transmission HARQ processor 20 in FIG. 13 may be performed.

While the inventive concept has been particularly shown and described with reference to embodiments thereof, it will be understood that various changes in form and details may be made therein without departing from the spirit and scope of the following claims.

What is claimed is:

1. An operating method of a receiving device configured to perform a hybrid automatic repeat and request (HARQ) process, the operating method comprising:
   receiving data from a target transmitting device via a sidelink channel;
   determining whether to request transmission of replacement data for the data from the target transmitting device according to a performance result of the HARQ process on the received data; and when transmission of the replacement data is requested, transmitting to the target transmitting device a replacement data request signal distinct from an acknowledge (ACK) signal and a negative-ACK (NACK) signal,
   wherein the replacement data has a second coding rate lower than a first coding rate of data transmitted in response to the NACK signal.

2. The operating method of claim 1, wherein the determining of whether to request transmission of the replacement data comprises determining whether there is an available storage region in an HARQ buffer storing the performance result of the HARQ process, when the decoding of the data has failed according to the performance result of the HARQ process,
   wherein the transmitting of the replacement data request signal to the target transmitting device comprises providing the replacement data request signal as feedback to the target transmitting device, when there is no available storage region in the HARQ buffer.

3. The operating method of claim 1, wherein the determining of whether to request transmission of the replacement data comprises determining to request the replacement data for the data from the target transmitting device, when a reset of the HARQ process for the data is requested from an upper layer of a layer where the HARQ process is performed.

4. The operating method of claim 1, further comprising receiving, from the target transmitting device, replacement data in which a combining method of HARQ data is changed or a redundancy version according to the HARQ data is changed to a redundancy version corresponding to an initial transmission of the HARQ process.

5. The operating method of claim 1, further comprising determining a base sequence based on a resource pool allocated to the sidelink channel; and
   generating a signal comprising a cyclically shifted code from the base sequence as a selected one of the ACK signal, the NACK signal, and the replacement data request signal.

6. The operating method of claim 5, wherein the generating of the signal as the selected one of the ACK signal, the NACK signal, and the replacement data request signal comprises:
   determining a cyclic shift value based on a first shift value corresponding to a cyclic shift index and a second shift value corresponding to the performance result of the HARQ process; and
   cyclic shifting the base sequence based on the cyclic shift value.

7. The operating method of claim 6, wherein the cyclic shift value corresponding to the replacement data request signal is a value set as at least one of remaining cyclic shift values except for predefined cyclic shift values corresponding to the ACK signal and the NACK signal, among candidate cyclic shift values.

8. The operating method of claim 6, wherein the determining of the cyclic shift value comprises:
   setting a candidate cyclic shift index so that a value obtained by dividing a number of candidate cyclic shift values by a number of types of feedback signals comprising the ACK signal, the NACK signal, and the replacement data request signal is equal to or less than a number of candidate cyclic shift indices; and
   determining any one of the candidate cyclic shift indices as the cyclic shift index corresponding to the first shift value.

9. An operating method of a transmitting device, the operating method comprising:
   transmitting data to a receiving device via a sidelink channel;
   receiving, as a feedback signal from the receiving device, an acknowledge (ACK) signal, a negative-ACK (NACK) signal, or a replacement data request signal distinct from the ACK signal and the NACK signal according to a performance result of a hybrid automatic repeat and request (HARQ) process at the receiving device; and
   transmitting replacement data for the transmitted data to the receiving device when the feedback signal is the replacement data request signal,
   wherein the replacement data has a second coding rate lower than a first coding rate of data transmitted in response to the NACK signal.

10. The operating method of claim 9, wherein the transmitting of the replacement data comprises:
    setting a protocol of a network defined between the receiving device and the transmitting device at an initial transmission status.

11. The operating method of claim 9, wherein the transmitting of the replacement data comprises:
    transmitting to the receiving device the replacement data according to a redundancy version by setting the redundancy version for the data as a redundancy version corresponding to an initial transmission.

12. The operating method of claim 9, wherein, when the data is generated so that data transmitted to the receiving device via the sidelink channel performs the HARQ process in an incremental redundancy (IR) combining method, the replacement data is data defined to perform the HARQ process in a chase combining method.

13. The operating method of claim 9, wherein the receiving of the feedback signal comprises receiving the replacement data request signal from the receiving device when there is no available storage region in an HARQ buffer of the receiving device, which stores a performance result of the HARQ process.

14. The operating method of claim 9, wherein the determining of the type of the feedback signal comprises differentiating the type of the feedback signal based on a cyclically shifted code from a base sequence, which is determined based on a resource pool allocated to the sidelink channel.

15. The operating method of claim 9, wherein the transmitting of the replacement data comprises:
    collecting feedback signals received from a plurality of receiving devices comprising the receiving device;
    calculating a ratio of the replacement data request signal of the collected feedback signals; and
    transmitting the replacement data to the plurality of receiving devices when the ratio of the replacement data request signal exceeds a threshold ratio.

16. A receiving device comprising:
a hybrid automatic repeat and request (HARQ) buffer storing a performance result of an HARQ process on data received from a target transmitting device via a sidelink channel;
a HARQ processor determining whether to request transmission of replacement data for data from the target transmitting device according to the performance result of the HARQ process on the received data, and when the transmission of the replacement data is requested, determining a feedback signal to be transmitted to the target transmitting device as a replacement data request signal distinct from an acknowledge (ACK) signal and a negative-ACK (NACK) signal; and
a radio frequency integrated circuit (RFIC) transmitting the determined replacement data request signal to the target transmitting device,
wherein the replacement data has a second coding rate lower than a first coding rate of data transmitted in response to the NACK signal.

17. The receiving device of claim 16, wherein the HARQ processor determines whether there is an available storage region in the HARQ buffer, and when there is no available storage region in the HARQ buffer, generates the replacement data request signal.

18. The receiving device of claim 16, wherein the HARQ processor, determines to request the replacement data for the data from the target transmitting device, when a reset of the HARQ process for the data is requested from an upper layer of a layer where the HARQ process is performed.

19. The receiving device of claim 16, wherein the HARQ processor determines a base sequence based on a resource pool allocated to the sidelink channel, and determines the feedback signal to be transmitted to the target transmitting device based on a cyclically shifted code from the base sequence.

20. The receiving device of claim 19, wherein the HARQ processor determines a cyclic shift value based on a first shift value corresponding to a cyclic shift index and a second shift value corresponding to the performance result of the HARQ process, and performs cyclic shift from the base sequence based on the cyclic shift value.

* * * * *